(12) United States Patent
Echtle et al.

(10) Patent No.: US 11,598,460 B2
(45) Date of Patent: Mar. 7, 2023

(54) MULTI-LUMEN HOSE AND CONNECTOR NIPPLE

(71) Applicant: Hansgrohe SE, Schiltach (DE)

(72) Inventors: Klaus Echtle, Nordrach (DE); Günter Glunk, Fluorn-Winzeln (DE); Uwe Herzog, Rheinau/Diersheim (DE); Thomas Pflaumer, Lahr (DE)

(73) Assignee: Hansgrohe SE, Schiltach (DE)

( * ) Notice: Subject to any disclaimer, the term of this patent is extended or adjusted under 35 U.S.C. 154(b) by 4 days.

(21) Appl. No.: 16/919,093

(22) Filed: Jul. 1, 2020

(65) Prior Publication Data

US 2021/0003236 A1    Jan. 7, 2021

(30) Foreign Application Priority Data

Jul. 2, 2019  (DE) .................... 10 2019 209 670.0

(51) Int. Cl.
*F16L 33/24*    (2006.01)
*F16L 33/22*    (2006.01)
(Continued)

(52) U.S. Cl.
CPC ........... *F16L 33/24* (2013.01); *F16L 33/2073* (2013.01); *F16L 33/223* (2013.01); *F16L 39/02* (2013.01)

(58) Field of Classification Search
CPC ..... F16L 33/24; F16L 33/2073; F16L 33/223; F16L 39/00; F16L 39/02; F16L 11/22;
(Continued)

(56) References Cited

U.S. PATENT DOCUMENTS 5,171,316 A  * 12/1992 Mehigan
5,735,467 A     4/1998  Lee
(Continued)

FOREIGN PATENT DOCUMENTS

CA      3009423 A1    6/2017
CN     203703450 U    7/2014
(Continued)

OTHER PUBLICATIONS

Office Action in German Language issued by the German Patent Office, Munich, Germany, dated May 8, 2020, for German Patent Application No. 10 2019 209 670.0.
(Continued)

*Primary Examiner* — Zachary T Dragicevich
*Assistant Examiner* — William S. Choi
(74) *Attorney, Agent, or Firm* — Bose McKinney & Evans LLP (57) ABSTRACT

A multi-lumen hose connector nipple and a multi-lumen hose equipped therewith. The multi-lumen hose connector nipple includes a nipple basic section through which a plurality of separate fluid conduits extend in each case between a first and a second nipple connector side, a plurality of hose lumen plug-in sockets integral with the nipple basic section, which sockets extend juxtaposed on the first nipple connector side with an intermediate hose lumen wall accommodation space left therebetween, wherein a socket interior space of each of the hose lumen plug-in sockets is assigned to a respective one of the fluid conduits and opens out axially, and a socket strutting structure within the socket interior space of at least one of the hose lumen plug-in sockets.

12 Claims, 4 Drawing Sheets

(51) Int. Cl.
*F16L 33/20* (2006.01)
*F16L 39/02* (2006.01)
*F16L 33/207* (2006.01)

(58) Field of Classification Search
CPC ... F16L 37/56; A61M 39/105; A61M 39/1088
USPC .................................. 285/239, 124.1, 124.4
See application file for complete search history.

(56) References Cited

U.S. PATENT DOCUMENTS

| | | | |
|---|---|---|---|
| 5,908,055 | A | 6/1999 | Baumann et al. |
| 9,261,213 | B2 | 2/2016 | Mager et al. |
| 9,447,904 | B2 | 9/2016 | Kury et al. |
| 9,458,958 | B2 | 10/2016 | Kury et al. |
| 9,476,529 | B2 | 10/2016 | Kury et al. |
| 9,625,072 | B2 | 4/2017 | Kury et al. |
| 10,288,201 | B2 | 5/2019 | Wildfang |
| 2001/0017163 | A1* | 8/2001 | Penza ................... F16L 11/22 |
| 2004/0034324 | A1* | 2/2004 | Seese ................ A61M 39/105 |
| 2004/0183305 | A1* | 9/2004 | Fisher ................... F16L 39/00 |
| | | | 285/124.1 |
| 2005/0077729 | A1* | 4/2005 | Huong Fu ............... F16L 39/02 |
| 2005/0161533 | A1 | 7/2005 | Nobili |
| 2006/0145478 | A1* | 7/2006 | Hwang |
| 2008/0147012 | A1* | 6/2008 | Rome ................ A61M 39/105 |
| 2009/0051164 | A1 | 2/2009 | Lirsch |
| 2009/0211654 | A1 | 8/2009 | Nobili |
| 2010/0318069 | A1 | 12/2010 | Hall et al. |
| 2014/0358120 | A1* | 12/2014 | Haarala ............... A61M 39/105 |

FOREIGN PATENT DOCUMENTS

| | | |
|---|---|---|
| CN | 104798478 A | 7/2015 |
| CN | 106465587 A | 3/2017 |
| CN | 206802633 U | 12/2017 |
| DE | 3939714 A * | 6/1991 ............. F16L 11/22 |
| DE | 297 00 1 26 U1 | 2/1997 |
| DE | 29708873 U1 | 7/1997 |
| DE | 29720516 U1 | 2/1998 |
| DE | 19825553 A1 | 12/1999 |
| DE | 19825554 A1 | 12/1999 |
| DE | 20013555 U1 | 12/2000 |
| DE | 10063234 C1 | 7/2002 |
| DE | 102009039972 A1 | 5/2010 |
| DE | 102011105075 A1 | 12/2012 |
| DE | 202014100762 U1 * | 7/2015 |
| DE | 102014005837 B3 | 8/2015 |
| DE | 102015122346 A1 | 6/2017 |
| EP | 1557501 A1 | 7/2005 |
| EP | 1985905 A1 | 10/2008 |
| EP | 2240234 A1 | 10/2010 |
| EP | 2549024 A1 | 1/2013 |
| EP | 2650580 A1 | 10/2013 |
| EP | 2710287 A1 | 3/2014 |
| EP | 2724068 A2 | 4/2014 |
| EP | 3063449 A1 | 9/2016 |
| EP | 3404305 B1 * | 6/2020 |
| GB | 941333 | 11/1963 |
| GB | 2 290 848 A | 1/1996 |
| WO | 2007004050 A1 | 1/2007 |
| WO | 2007068024 A1 | 6/2007 |

OTHER PUBLICATIONS

European Search Report issued by the European Patent Office (Munich), dated Nov. 4, 2020, for Application No. EP20181918.2; 5 pages.

Office Action issued by the National Intellectual Property Administration, P.R. China, dated Oct. 22, 2021 for Chinese Patent Application No. 202010627289.5 (Chinese Language), 11 pages.

* cited by examiner

MULTI-LUMEN HOSE AND CONNECTOR NIPPLE

CROSS-REFERENCE TO RELATED APPLICATION

This application claims priority to German Patent Application No. DE 10 2019 209 670.0, filed on Jul. 2, 2019, the disclosure of which is expressly incorporated herein by reference.

BACKGROUND AND SUMMARY OF THE DISCLOSURE

The invention relates to a multi-lumen hose connector nipple and to a multi-lumen hose equipped therewith, in particular for use in sanitary engineering as a sanitary multi-lumen hose.

Multi-lumen hoses, that is to say hoses which have in their interior two or more lumina, fluidically separated from one another and extending over the length of the hose, in the form of corresponding hollow channels, are common for certain applications in sanitary engineering and in other areas. With such a hose, it is possible for multiple liquid or gaseous media to be conducted separately from one another, or the respective lumen may be used in another manner, for example for leading through electrical lines, optical fibers or rod/cable elements serving other purposes. The present multi-lumen hose connector nipple serves for providing a connection to the multi-lumen hose for at least two of the hose lumina separately from one another, that is to say, via the nipple, at least two of the lumina of the hose can, separately from one another, be coupled to in each case one separate fluid feed line or fluid discharge line.

The utility model publication DE 297 20 516 U1 discloses a hose fitting which serves for delivery of fuel to tank systems and which has a multi-lumen hose into the lumina of which it is possible to plug individual hose nipples which are held captively in bores of a radial separating wall of a coupling and clamping element in the form of a sleeve. On its clamping side, the sleeve surrounds the hose, which is able to be inserted as far as the separating wall, and securely holds it in a clamping manner, for which purpose, there, the inner diameter of said sleeve is smaller than the hose outer diameter. On its coupling side, a fixing insert for fixing the hose nipples is able to be inserted into the sleeve.

The laid-open publication WO 2007/004050 A1 discloses a sanitary two-lumen hose for separate guidance of treated water and mains water, specifically for corresponding selective supply of water to a shower head which is able to be adjoined thereto, wherein the hose is provided at its ends with in each case one matching two-lumen hose connector nipple. The two-lumen hose is of the hose-in-hose type with an outer hose and an inner hose which is accommodated in the latter, wherein the two individual hoses are each individually fixed to one of two coaxial connecting pieces of the respective nipple. By way of one nipple, the two-lumen hose can be coupled in a rotationally conjoint manner to the shower head, and by way of the other nipple, it can be coupled in a rotationally movable manner onto an associated water supply.

The utility model publication DE 297 08 873 U1 discloses a sanitary two-lumen shower head, having two cross-sectionally half-moon-shaped lumina, and an associated two-lumen hose connector nipple, having a nipple base portion through which there extend, in each case between a first and a second nipple connector side, two separate fluid conduits and having two hose lumen plug-in connecting pieces which are integral with the nipple base portion and which extend adjacently to one another on the first nipple connector side so as to leave clear an interposed hose lumen wall-receiving space, wherein a connecting piece interior space of each of the two hose lumen plug-in connecting pieces belongs to in each case one of the fluid conduits and opens out axially. The two fluid conduits open out coaxially with respect to one another on the second nipple connector side. By way of the respective connector nipple, the two-lumen hose is able to be connected to both a shower head and an associated water supply.

It is an object of the invention to provide a multi-lumen hose connector nipple, which is improved in comparison with the aforementioned prior art, in particular with regard to its functionality and/or its production outlay, and a multi-lumen hose equipped therewith.

The invention achieves this and other objects by providing a multi-lumen hose connector nipple comprising a nipple base section or portion through which there extends, in each case between a first and a second nipple connector side, a plurality of separate fluid conduits. The nipple further includes a plurality of hose lumen plug-in sockets or connecting pieces which are integral with the nipple base portion, and a socket or connecting piece strutting structure for at least one of the hose lumen plug-in connecting pieces. The hose lumen plug-in connecting pieces extend juxtaposed, i.e. adjacently to one another, on the first nipple connector side so as to leave clear an intermediate or interposed hose lumen wall-receiving, i.e. wall accommodation, space, wherein a socket or connecting piece interior space of each of the hose lumen plug-in sockets or connecting pieces belongs to in each case one of the fluid conduits and opens out axially. The connecting piece or socket strutting structure is situated in the connecting piece or socket interior space of at least one of the hose lumen plug-in sockets or connecting pieces. In this way, it is able to strut, that is to say support, the respective hose lumen plug-in connecting piece with respect to radially inwardly acting pressure. This avoids deformation of or damage to the hose lumen plug-in connecting piece due to radially inwardly acting clamping pressure, as typically arises when the hose end is securely clamped in a fluid-tight manner on the plugged-in plug-in connecting piece of the nipple.

With this measure, it is consequently possible through the use of the multi-lumen hose connector nipple according to the invention to realize secure, fluid-tight coupling-on of a multi-lumen hose. For this purpose, a single hose-clamping means over the outer periphery of the multi-lumen hose may suffice in particular, the nipple according to the invention not requiring separate sealing measures for the individual hose lumen plug-in connecting pieces or the associated lumina of the multi-lumen hose. The nipple may in particular be used for connecting a sanitary multi-lumen hose.

Advantageous refinements of the invention are specified, for example, in the dependent claims.

In one refinement of the invention, the connecting piece strutting structure is formed integrally with the hose lumen plug-in connecting pieces. This can simplify the manufacture of the nipple. In particular, in corresponding embodiments, the nipple may be manufactured entirely as an integral, i.e. one-piece, component.

In one refinement of the invention, the connecting piece strutting structure comprises in at least one of the connecting piece interior spaces a support strut which extends with a radial main direction component between two radially opposite wall portions of the respective hose lumen plug-in connecting piece. This results in an efficient support function for the respective connecting piece interior space with respect to pressure acting radially from the outside, with relatively low production outlay.

In one refinement of the invention, the hose lumen plug-in connecting pieces are arranged within a circular or oval boundary line. This nipple configuration facilitates efficient manufacture of the nipple, and, when a correspondingly configured multi-lumen hose is coupled on, a single hose-clamping along said boundary line can suffice for achieving a secure, fluid-tight connection of all the hose lumen plug-in sockets or connecting pieces to the associated lumina of the multi-lumen hose.

In one development of the invention, the hose lumen plug-in connecting pieces are arranged with a sector-shaped cross section adjacently to one another in a circumferential direction within the circular or oval boundary line. This connecting piece configuration may be advantageous for corresponding applications, in particular with the use of a multi-lumen hose with a correspondingly sector-shaped cross section of its lumina.

In one refinement of the invention, a first one of the fluid conduits opens out axially on the second nipple connector side, while a second one of the fluid conduits opens out radially on the second nipple connector side. This may be advantageously used for corresponding connection configurations.

In one development of the invention, the nipple base portion has on the second nipple connector side a conical region at which the second fluid conduit opens out radially and from which there axially extends a nipple connector connecting piece, through which the first fluid conduit opens out axially. This too may be advantageously used for corresponding connection configurations.

The invention achieves the above-mentioned and other objects also by providing a multi-lumen hose comprising a multi-lumen hose body, which has a plurality of separate hose lumina, and a connector unit at one end of the multi-lumen hose body, wherein the connector unit comprises a multi-lumen hose connector nipple according to the disclosure, which is plugged with its hose lumen plug-in connecting pieces into in each case one of the multiple hose lumina of the multi-lumen hose body. The connector unit furthermore comprises a ferrule which surrounds the multi-lumen hose body in an end region which receives the plugged-in hose lumen plug-in connecting pieces, so as to press thereagainst. This realizes an advantageously simple and functionally reliable coupling of the multi-lumen hose connector nipple to the multi-lumen hose body, for which a single ferrule, which surrounds the multi-lumen hose body as a whole, already suffices. It is not necessary for the hose lumen plug-in connecting pieces of the nipple to be individually connected in a fluid-tight manner to the respective lumina of the multi-lumen hose body. The connecting piece strutting structure of the nipple provides for sufficient dimensional stability of the respective hose lumen plug-in connecting piece with respect to the pressing pressure, able to be exerted by the ferrule, for the fluid-tight coupling of nipple and hose body. Optionally, the multi-lumen hose may be equipped at both ends with such a connector unit.

In one refinement of the invention, the nipple base portion has a radially outwardly projecting stop flange against which the ferrule and/or the end of the multi-lumen hose body bear(s) axially. The connector unit comprises a union connection nut which is supported or rests by way of a stop shoulder against the stop flange. This configuration may be advantageously used for cases in which the multi-lumen hose is to be connected to a further system component by means of the union connection nut, for example to a shower body or a multi-channel water supply in the case of sanitary applications.

Additional features and advantages of the present invention will become apparent to those skilled in the art upon consideration of the following detailed description of the illustrative embodiments best exemplifying the best mode of carrying out the invention as presently perceived.

BRIEF DESCRIPTION OF THE DRAWINGS

Advantageous exemplary embodiments of the invention are illustrated in the drawings. These and other advantageous embodiments of the invention will be described below. In the drawings.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

FIGS. 1 to 5 show a multi-lumen hose connector nipple in an exemplary two-lumen embodiment. The nipple has a nipple base portion 1, a plurality of hose lumen plug-in connecting pieces 2a, 2b which are integral with the nipple base portion 1, and a connecting piece strutting structure 3. Multiple separate fluid conduits 4a, 4b ex-tend, in each case between a first nipple connector side 5 and a second nipple connector side 6, through the nipple base portion 1. The hose lumen plug-in connecting pieces 2a, 2b extend adjacently on the first nipple connector side 5 so as to leave clear an interposed hose lumen wall-receiving space 7. A connecting piece interior space 8a, 8b of each of the hose lumen plug-in connecting pieces 2a, 2b belongs to in each case one of the fluid conduits 4a, 4b and opens out axially.

The connecting piece strutting structure 3 is situated in the connecting piece interior space 8a, 8b of at least one of the hose lumen plug-in connecting pieces 2a, 2b, it being situated in the connecting piece interior space 8a, 8b of both of, that is to say all, the hose lumen plug-in connecting pieces 2a, 2b in the example shown and, in alternative embodiments, only in some of the hose lumen plug-in connecting pieces 2a, 2b. The connecting piece strutting structure 3 results in the respective connecting piece interior space 8a, 8b having an in-creased compressive strength, in particular with respect to residual/clamping pressures acting radially inwards from the outside, as occur typically in the normal pressing or clamping of a hose end on a connector unit, such as a nipple.

Figure 3:
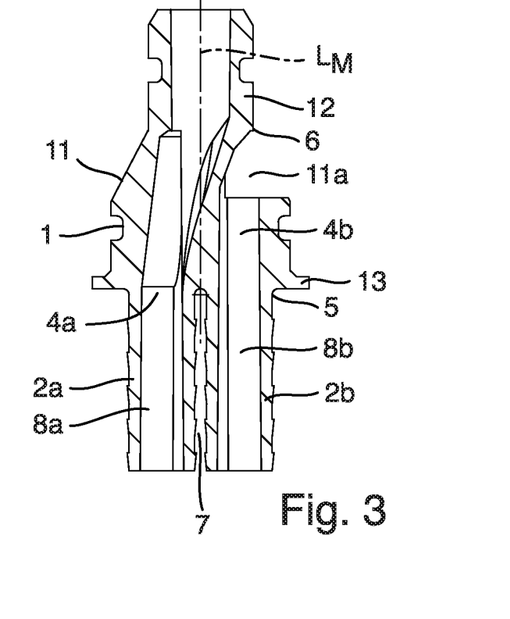
FIG. 3 shows a longitudinal sectional view along a line III-III in FIG. 2.

In corresponding embodiments, the connecting piece strutting structure 3, as in the example shown, is formed integrally with the hose lumen plug-in connecting pieces 2a, 2b. Here, the nipple, as in the example shown, may advantageously be formed integrally as a whole, for example from a plastic material which is common per se for this purpose and for example as a component which is produced by plastic injection-molding technology; in alternative embodiments, said nipple consists of two or more individual parts; in the latter case for example, one or more additional components which are attached to the nipple base portion 1 on the second nipple connector side 6 may be involved. Generally, however, completely integral manufacture of the nipple has advantages with regard to achieving a low production outlay.

In corresponding embodiments, the connecting piece strutting structure 3, as in the example shown, comprises in at least one of the connecting piece interior spaces 8a, 8b a support strut 3a which extends with a radial main direction component between two radially opposite wall portions 9a, 9b of the respective hose lumen plug-in connecting piece 2a, 2b. Such a support strut 3a allows the compressive strength of the respective hose lumen plug-in connecting piece 2a, 2b to be increased highly effectively without the connecting piece strutting structure 3 appreciably interfering with the fluid passage through the connecting piece interior space 8a, 8b. In the example shown, the respective support strut 3a extends radially, that is to say in each case outwards from a point M, which is central in the cross section in FIG. 4, along a radial line; in alternative embodiments, said support strut extends obliquely with respect to the radial direction. In further alternative embodiments, the connecting piece strutting structure 3 is formed differently, for example using one or more support struts which extend so as to be suitably bent or curved substantially in a circumferential direction. The support strut 3a is dimensioned such that it does not significantly reduce the cross section of the respective connecting piece interior space 8a, 8b and therefore does not impair the fluid flow in the connecting piece interior space 8a, 8b. Axially, according to requirement, the support strut 3a may extend over the entire length of the respective plug-in connecting piece 2a, 2b, or only over a part of the latter, in corresponding embodiments also in the form of multiple support strut portions axially spaced apart from one another. At any rate, the connecting piece strutting structure 3 does not cause continuous division of the respective fluid conduit 4a, 4b into multiple separate fluid conduits, but rather leaves the respective fluid conduit 4a, 4b unitary or undivided/unbranched.

Figure 4:
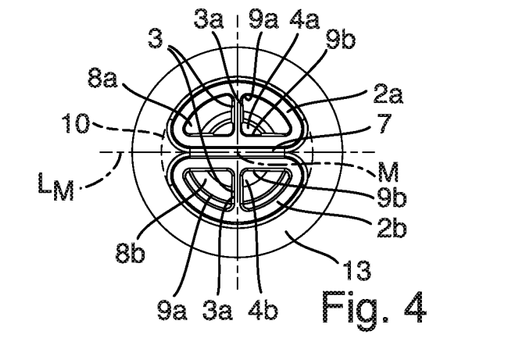
FIG. 4 shows a plan view of a first connector side of the nipple in FIGS. 1 to 3.

In corresponding embodiments, the hose lumen plug-in connecting pieces 2a, 2b, as in the example shown, are arranged within a circular or oval boundary line 10, for example as shown with a sector-shaped cross section adjacently to one another in a circumferential direction. Consequently, the nipple is matched to a corresponding lumen configuration of a multi-lumen hose for whose connection it serves, and, along the common boundary line 10 of the hose lumen plug-in connecting pieces 2a, 2b, joint pressing or clamping of the hose connector can be realized. In the two-lumen embodiment shown, the sector-shaped cross section, as illustrated, is a semicircular or half-moon-shaped cross section.

In corresponding embodiments, a first fluid conduit 4a of the two fluid conduits 4a, 4b opens out axially on the second nipple connector side 6, and a second fluid conduit 4b of the fluid conduits 4a, 4b opens out radially on the second nipple connector side 6. In alternative embodiments, it is possible for example for both fluid conduits 4a, 4b to open out axially on the second nipple connector side 6, for example coaxially with respect to one another.

Figure 5:
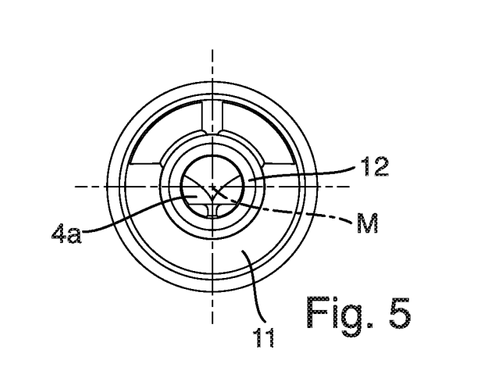
FIG. 5 shows a plan view of a second connector side of the nipple.

In corresponding embodiments, as in the example shown, the nipple base portion 1 has on the second nipple connector side 6 a conical region 11 at which the second fluid conduit 4b opens out radially and from which there axially extends a nipple connector connecting piece 12, through which the first fluid conduit 4a opens out axially. The radial opening-out point of the second fluid conduit 4b at the conical region 11 comprises a corresponding mouth opening 11a in the conical region 11. Due to the conicity of this region 11, according to requirement, the radial nipple opening-out point can be diverted into a continued portion, coaxial with respect to the first fluid conduit 4a, of the second fluid conduit 4b using a suitable coupling connector sleeve.

Figure 1:
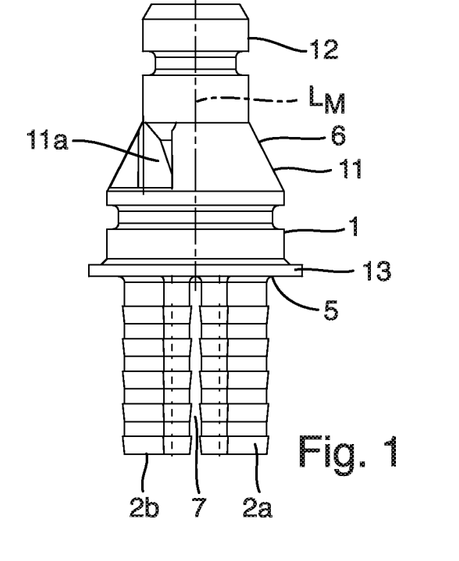
FIG. 1 shows a side view of a multi-lumen hose connector nipple in a two-lumen embodiment.
Figure 2:
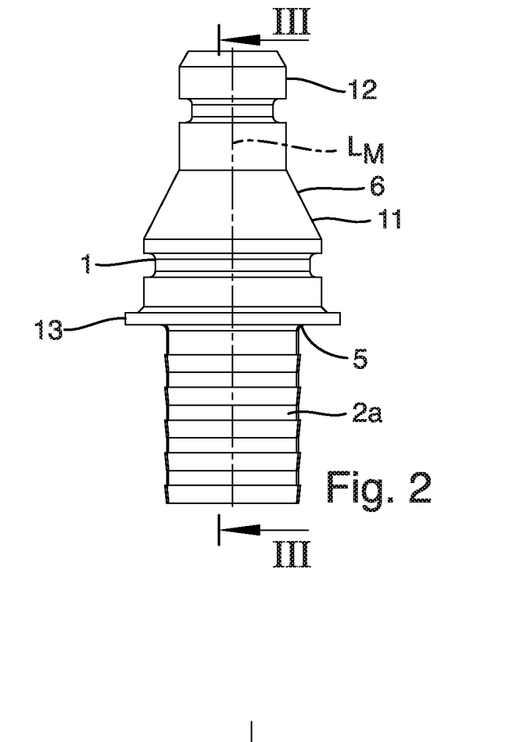
FIG. 2 shows the side view in FIG. 1 rotated through 90°.

In corresponding embodiments, the nipple, as in the example shown, has on its nipple base portion 1 a radially outwardly projecting stop flange 13. Said stop flange may serve in particular as a stop for a multi-lumen hose to be plugged onto the plug-in connecting pieces 2a, 2b.

In corresponding embodiments, the plug-in connecting pieces 2a, 2b, as in the example shown, are arranged symmetrically with respect to a longitudinal central axis LM of the nipple, and the nipple connector connecting piece 12 on the second nipple connector side 6 extends centrally with respect to said longitudinal central axis LM. Accordingly, the associated first fluid conduit 4a has a portion, extending obliquely with respect to the axial direction, in the conical region 11 of the nipple base portion 1 between the associated hose lumen plug-in connecting piece 2a on the first connector side 5 and the central nipple connector connecting piece 12 on the second connector side 6.

The multi-lumen hose shown in FIGS. 6 to 11 comprises a multi-lumen hose body 14, which has a plurality of separate hose lumina 15a, 15b, and a connector unit 16 at one end 14a of the multi-lumen hose body 14. Optionally, as in the example shown, the connector unit 16 is also provided at the other end 14b of the multi-lumen hose body 14. The respective connector unit 16 comprises a multi-lumen hose connector nipple 17 according to the disclosure, which is plugged with its hose lumen plug-in connecting pieces 2a, 2b into in each case one of the multiple hose lumina 15a, 15b of the multi-lumen hose body 14 and which may in particular be a nipple in the realization shown in FIGS. 1 to 5 or in one of the alternative, aforementioned realizations.

Figure 9:
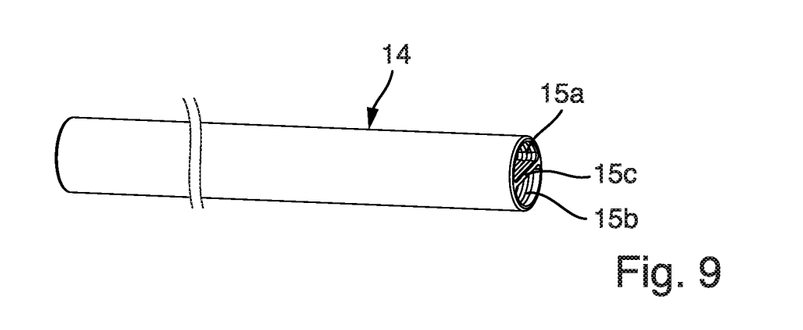
FIG. 9 shows a perspective view of a two-lumen hose body for the multi-lumen hose in FIGS. 6 to 8.
Figure 10:
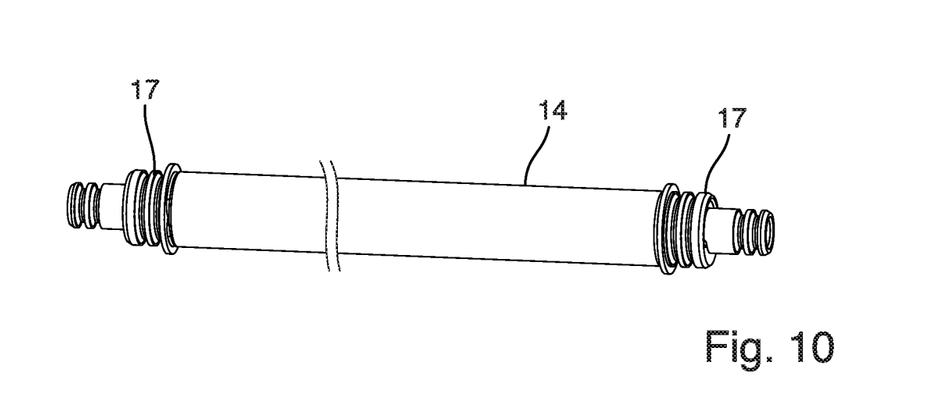
FIG. 10 shows the perspective view in FIG. 9 with nipples fitted on both sides.
Figure 11:
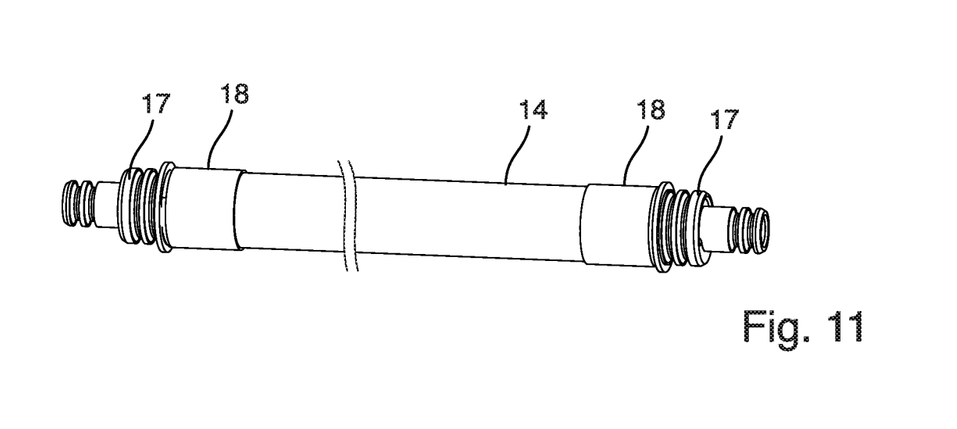
FIG. 11 shows the perspective view in FIG. 10 with additionally attached ferrules.

The connector unit 16 furthermore comprises a ferrule 18 which surrounds the multi-lumen hose body 14 in an end region which receives the plugged-in hose lumen plug-in connecting pieces 2a, 2b, so as to press thereagainst. FIGS. 9 to 11 illustrate for this purpose a manufacturing sequence with, firstly, the multi-lumen hose body 14 on its own as per FIG. 9, the multi-lumen hose connector nipple 17, attached in each case on an end side, as per FIG. 10, and the ferrule 18, subsequently attached, for fluid-tight pressing of the connection of multi-lumen hose body 14 and multi-lumen hose connector nipple 17.

Figure 7:
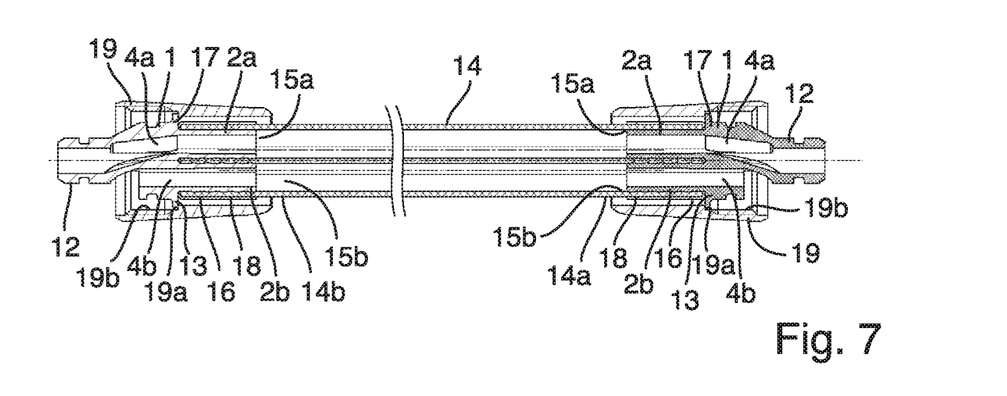
FIG. 7 shows a sectional view along a line VII-VII in FIG. 6.
Figure 8:
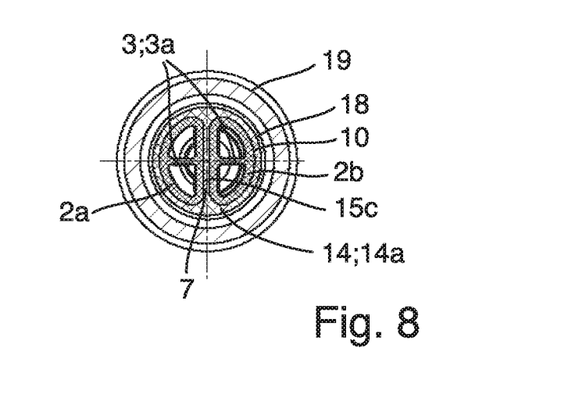
FIG. 8 shows a sectional view along a line VIII-VIII in FIG. 6.

As can be seen in particular from FIGS. 7 and 8, the ferrule 18, along the aforementioned boundary line 10 of the hose lumen plug-in connecting pieces 2a, 2b, extends jointly around the latter and the hose material surrounding this, wherein, additionally, a lumen separating wall 15c, which is rectilinear in the example of the multi-lumen hose body 14 shown in FIG. 9, is received in the hose lumen wall-receiving space 7 between the hose lumen plug-in connecting pieces 2a, 2b. Altogether, in this way, a very reliable fluid-tight connection of the respective connector unit 16, and in particular the respective nipple 17, to the end region of the multi-lumen hose body 14 is achieved with very low outlay using only one ferrule 18. The connecting piece strutting structure 3 provides for sufficient pressure stability of the respective hose lumen plug-in connecting piece 2a, 2b, with the result that the latter is not deformed, let alone damaged, by the pressing or clamping of the hose material to and on the nipple 17. In order to promote the retention of the plugged-on hose material, the connecting pieces 2a, 2b are optionally, as in the example shown, provided on their outer surface, preferably all the way around, with a corresponding retention profile, such as a saw tooth-like or fir tree-like profile.

Figure 6:
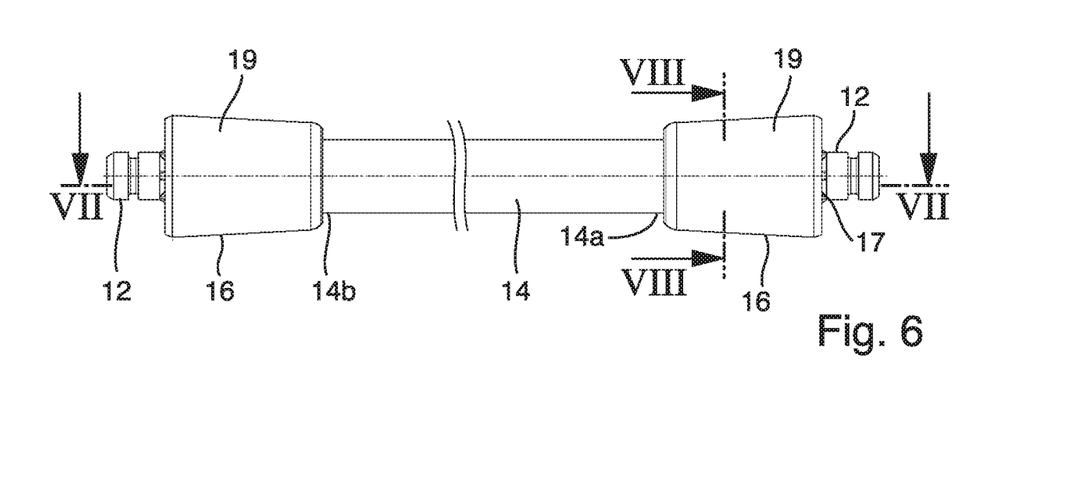
FIG. 6 shows a side view of a multi-lumen hose in a two-lumen embodiment with a connector unit on both sides, with use made of in each case one nipple as per FIGS. 1 to 5.

In corresponding embodiments, the connector unit 16, as in the example shown, has a union connection nut 19, which is supported by way of a stop shoulder 19a against the stop flange 13 of the nipple 17. The union connection nut 19 allows the multi-lumen hose provided with the connector unit 16 to be connected in a desired manner to a further system component, for example to a shower body or a multi-channel water supply in the case of sanitary applications. For connection to the system component to be coupled on, the union connection nut 19 has a suitable coupling element, an inner thread 19b in the example shown.

Figure 12:
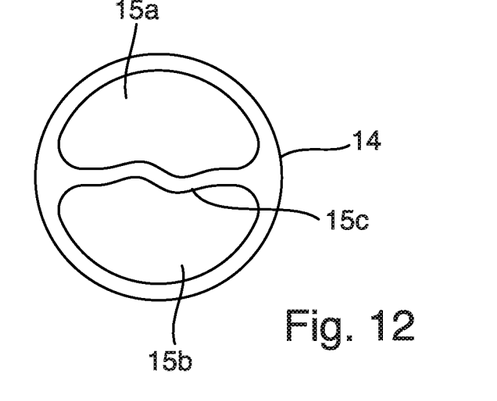
FIG. 12 shows a schematic cross-sectional illustration of an alternatively usable two-lumen hose body, with a lumen separating wall which extends in an undulating rather than rectilinear manner.
Figure 13:
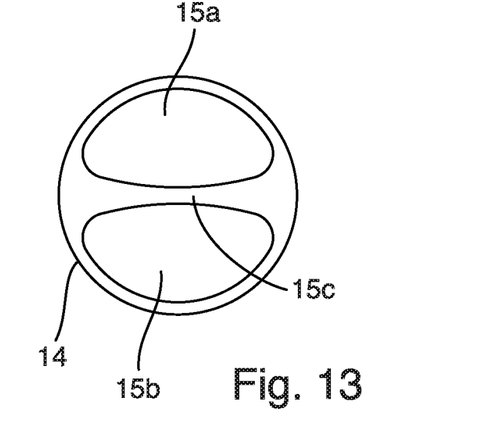
FIG. 13 shows the view in FIG. 12 for a further two-lumen hose body variant, with a centrally weakened lumen separating wall.
Figure 14:
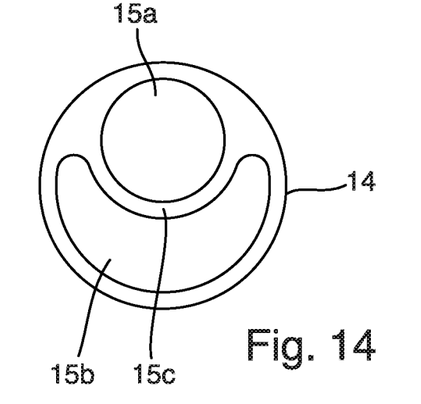
FIG. 14 shows the view in FIG. 12 for a further two-lumen hose body variant, with a circular lumen and a sickle-shaped lumen.

FIGS. 12 to 14 illustrate alternative configurations for the multi-lumen hose body 14 in a respective schematic cross-sectional view, in particular with regard to the configuration of the lumina 15a, 15b and of the lumen separating wall 15c. In the exemplary embodiment in FIG. 12, the lumen separating wall 15c is of undulating form instead of, as in the embodiment in FIG. 9, rectilinear form. In the embodiment variant in FIG. 13, the lumen separating wall 15c has a variable width, which is reduced towards the central region. These embodiment variants may be advantageous for achieving a desired bending behaviour of the multi-lumen hose body 14 in comparison with the rectilinear lumen separating wall 15c in FIG. 9.

In the embodiment variant in FIG. 14, the two hose lumina 15a, 15b are no longer of half-moon-shaped form in each case, but rather have mutually different cross-sectional shapes. Specifically, one lumen, for example the lumen 15a, is of circular cross section, while the other lumen, for example the lumen 15b, has a sickle-shaped cross section. Accordingly, in this example, there is an arcuate profile for the lumen separating wall 15c.

Figure 15:
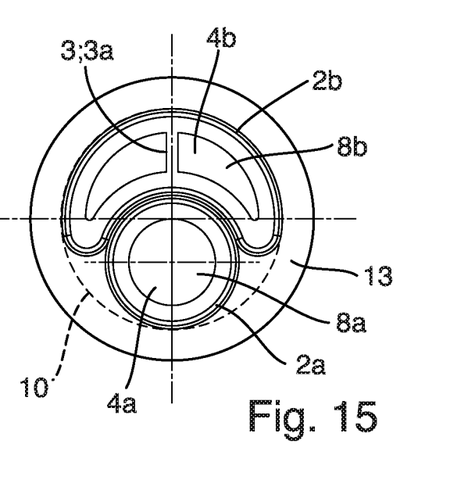
FIG. 15 shows the nipple view in FIG. 4 with respect to a nipple variant which is suitable for use with the hose body as per FIG. 14.

FIG. 15 shows in the corresponding plan view of the first connector side 5 a configuration of an associated multi-lumen hose connector nipple that matches the configuration of the multi-lumen hose body 14 as per FIG. 14, which multi-lumen hose connector nipple may otherwise be from one of the embodiment variants mentioned above in relation to FIGS. 1 to 5. For the nipple in FIG. 15, it is accordingly the case that one hose lumen plug-in connecting piece, for example the hose lumen plug-in connecting piece 2a, has a circular cross section, while the other hose lumen plug-in connecting piece, for example the hose lumen plug-in connecting piece 2b, has a sickle-shaped cross section. Advantageously, for this nipple, the connecting piece strutting structure 3 is provided at least in the connecting piece interior space 8b of the sickle-shaped hose lumen plug-in connecting piece 2b, again for example in the form of the support strut 3a. Since the other hose lumen plug-in connecting piece 2a is already inherently relatively pressure-stable due to its circular cross section, the introduction there of a support strut or the like may be omitted. In this embodiment variant too, the two hose lumen plug-in connecting pieces 2a, 2b are situated within the circular boundary line 10, which promotes the fluid-tight pressing of the nipple 17 to the multi-lumen hose body 14 by means of the ferrule 18.

Figure 16:
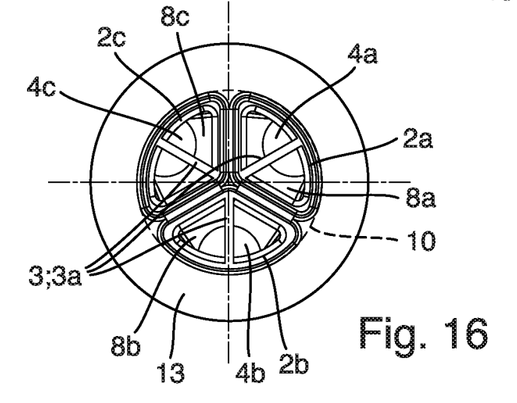
FIG. 16 shows the view in FIG. 15 with respect to a nipple variant which is suitable for use with a three-lumen hose with sector-shaped lumina.

Whereas two-lumen embodiments for the multi-lumen hose body 14 and the nipple 17 matching the latter have primarily been mentioned above, FIG. 16 illustrates in the plan view of FIG. 15 a nipple for connection of a three-lumen hose (not shown), which nipple has three hose lumina which are arranged adjacently to one another in a circumferential direction in a sector-shaped manner. In this case, the nipple has three hose lumen plug-in connecting pieces 2a, 2b, 2c with a sector-shaped cross section that are arranged adjacently to one another in a circumferential direction within the circular boundary line 10. In each of the connecting piece interior spaces 8a, 8b, 8c formed by the three connecting pieces 2a, 2b, 2c, there is arranged in each case one radially extending support strut 3a as a connecting piece strutting structure 3. Accordingly, three separate fluid conduits 4a, 4b, 4c extend through the nipple, with the result that said nipple is suitable as a connection or coupling means for a three-lumen hose for three-channel fluid guidance.

As the exemplary embodiments shown and explained above make clear, the invention advantageously makes available a multi-lumen hose connector nipple and a multi-lumen hose equipped therewith, wherein the nipple can be manufactured with relatively low outlay and coupled in a fluid-tight manner to a suitable multi-lumen hose body. The nipple and the multi-lumen hose are suitable in particular for sanitary applications, these also however being suitable for non-sanitary applications in which there is a need for multi-channel fluid guidance.

Although the invention has been described in detailed with reference to preferred embodiments, variations and modifications exist within the spirit and scope of the invention as described and defined in the following claims.

The invention claimed is:

1. A multi-lumen hose connector nipple comprising:
a nipple base section through which a plurality of separate fluid conduits extend in each case between a first nipple connector side and a second nipple connector side;
a plurality of hose lumen plug-in sockets integral with the nipple base section, which sockets extend on the first nipple connector side juxtaposed with an intermediate hose lumen wall accommodation space left therebetween, wherein a socket interior space of each of the hose lumen plug-in sockets is assigned to a respective one of the fluid conduits and opens out axially;

a socket strutting structure within the socket interior space of at least one of the hose lumen plug-in sockets; and wherein a first one of the fluid conduits opens out axially on the second nipple connector side, and a second one of the fluid conduits opens out radially on the second nipple connector side, wherein the nipple base section has a conical region on the second nipple connector side, on which conical region the second fluid conduit opens out radially and where a nipple connector socket extends axially, through which socket the first fluid conduit opens out axially, and wherein the first fluid conduit opens out axially on the first nipple connector side at an off-center position relative to a nipple longitudinal central axis, the first fluid conduit has a portion that extends obliquely with respect to the axial direction in the conical region of the nipple base section, and the first fluid conduit opens out axially on the second nipple connector side at a central position relative to the nipple longitudinal central axis.

2. The multi-lumen hose connector nipple according to claim 1,
wherein the socket strutting structure includes a support strut in at least one of the socket interior spaces, which strut extends with a radial main direction component continuously from one wall section to a radially opposite wall section of the corresponding hose lumen plug-in socket and wherein the support strut has an axial length such that the respective fluid conduit associated with the at least one hose lumen plug-in socket including the support strut is not continuously divided and forms a unitary fluid conduit.

3. The multi-lumen hose connector nipple according to claim 2, wherein the socket strutting structure is integral with the hose lumen plug-in socket.

4. The multi-lumen hose connector nipple according to claim 2, wherein the hose lumen plug-in sockets are arranged within a circular or oval boundary line.

5. The multi-lumen hose connector nipple according to claim 4, wherein the hose lumen plug-in sockets are arranged juxtaposed within the circular or oval boundary line with a sector-shaped cross section in the circumferential direction.

6. The multi-lumen hose connector nipple according to claim 2, wherein a first one of the fluid conduits opens out axially on the second nipple connector side, and a second one of the fluid conduits opens out radially on the second nipple connector side.

7. The multi-lumen hose connector nipple according to claim 1, wherein the socket strutting structure is integral with the hose lumen plug-in socket.

8. The multi-lumen hose connector nipple according to claim 1, wherein the hose lumen plug-in sockets are arranged within a circular or oval boundary line.

9. The multi-lumen hose connector nipple according to claim 8, wherein the hose lumen plug-in sockets are arranged juxtaposed within the circular or oval boundary line with a sector-shaped cross section in the circumferential direction.

10. A multi-lumen hose, comprising:
a multi-lumen hose body including a plurality of separate hose lumens; and
a connector unit on one end of the multi-lumen hose body;
wherein the connector unit comprises the multi-lumen hose connector nipple according to claim 7,
wherein the socket strutting structure includes a support strut in at least one of the socket interior spaces, which strut extends with a radial main direction component continuously from one wall section to a radially opposite wall section of the corresponding hose lumen plug-in socket and wherein the support strut has an axial length such that the respective fluid conduit associated with the at least one hose lumen plug-in socket including the support strut is not continuously divided and forms a unitary fluid conduit;
wherein the multi-lumen hose connector nipple is inserted with the hose lumen plug-in socket thereof in a corresponding one of the plurality of hose lumens of the multi-lumen hose body, and
wherein the connector unit has a ferrule surrounding the multi-lumen hose body in an end region accommodating the inserted hose lumen plug-in sockets and pressing against the inserted hose lumen plug-in sockets.

11. The multi-lumen hose according to claim 10, wherein the nipple base section has a stop flange protruding radially outwards, against which flange at least one of the ferrule and the end of the multi-lumen hose body abut axially, and the connector unit has a connector union nut which rests with a stop shoulder against the stop flange.

12. The multi-lumen hose according to claim 10, wherein the multi-lumen hose is a sanitary multi-lumen hose.

* * * * *